United States Patent [19]

Anderson

[11] Patent Number: 5,247,878
[45] Date of Patent: Sep. 28, 1993

[54] DEVICE FOR ABSORBING LIQUID LIPIDS FROM AN AQUEOUS FOOD MIXTURE

[76] Inventor: William H. Anderson, 2301 Oddie Blvd. #169, Reno, Nev. 89512

[21] Appl. No.: 816,479

[22] Filed: Jan. 3, 1992

[51] Int. Cl.$^5$ ............................................. A47J 43/28
[52] U.S. Cl. ....................................... 99/495; 210/237; 210/497.01; 210/487
[58] Field of Search ................. 99/495, 496, 456; 210/237, 253, 338, 470, 487, 498, 923, 924, DIG. 5, 497.01, 542, 494.3, 238, DIG. 8; 428/166, 906

[56] References Cited

U.S. PATENT DOCUMENTS

| | | | |
|---|---|---|---|
| 2,902,161 | 9/1959 | Humbert, Jr. et al. | 210/DIG. 8 |
| 3,018,896 | 1/1962 | Gewiss | 210/487 |
| 3,042,216 | 7/1962 | Goldman | 210/487 |
| 3,147,220 | 9/1964 | Avery | 210/DIG. 8 |
| 3,355,026 | 11/1967 | Schut | 210/DIG. 8 |
| 3,577,906 | 5/1971 | Preuss | 99/495 |
| 3,610,133 | 10/1971 | Mies et al. | 210/DIG. 8 |
| 3,865,023 | 2/1975 | Halvorsen | 99/495 |
| 3,904,528 | 9/1975 | Yocum | 210/924 |
| 3,951,814 | 4/1976 | Krueger | 210/DIG. 5 |
| 3,963,621 | 6/1976 | Newman | 210/321.74 |
| 4,083,780 | 4/1978 | Call | 210/321.74 |
| 4,199,447 | 4/1980 | Chambers | 210/DIG. 5 |
| 4,289,513 | 9/1981 | Brownhill et al. | 428/166 |
| 4,331,189 | 5/1982 | Joyner | 141/343 |
| 4,390,575 | 6/1983 | Kopp | 428/166 |
| 4,410,427 | 10/1983 | Wydeven | 210/487 |
| 4,471,014 | 9/1984 | den Hartog et al. | 428/906 |
| 4,588,631 | 5/1986 | Clark | 428/166 |
| 4,589,983 | 5/1986 | Wydevan | 210/487 |
| 4,640,185 | 2/1987 | Joyner | 99/495 |
| 4,650,581 | 3/1987 | Angles et al. | 210/DIG. 5 |
| 4,826,712 | 5/1989 | Theno | 428/906 |
| 4,897,206 | 1/1990 | Castelli | 210/487 |
| 4,904,327 | 2/1990 | Clark | 428/166 |
| 4,942,811 | 7/1990 | Kuhn | 99/495 |
| 5,084,177 | 1/1992 | Keene | 99/496 |
| 5,093,178 | 3/1992 | Sundstrom et al. | 428/906 |

Primary Examiner—Stanley S. Silverman
Assistant Examiner—Robert James Popovics

[57] ABSTRACT

A disposable device for absorbing and removing liquid lipids, primarily molten fats and oils, from the surface of an aqueous food mixture. The device comprising a multitude of capillary passages separated by partitions of a pellicular material possessing both hydrophobic and lipophilic properties. The capillary passages and partitions extend vertically through the device between its upper and lower faces. When exposed to the surface of an aqueous food mixture, the device selectively absorbs liquid lipids but does not absorb appreciable quantities of water or other ingredients present in the food mixture.

5 Claims, 1 Drawing Sheet

DEVICE FOR ABSORBING LIQUID LIPIDS FROM AN AQUEOUS FOOD MIXTURE

BACKGROUND OF THE INVENTION

1. Field of the invention.

This invention relates to devices for the removal of floating fats and oils from the surface of aqueous food mixtures.

2. Description of the prior art.

In the preparation of aqueous, meat based foods such as soups, broths, boiled dishes, gravies, stews and sauces, lipid substances, primarily fats and oils, are dislodged. These lipid substances have a specific gravity lower than the aqueous solution and will float to the surface. While these substances will usually solidify when chilled, they remain in a liquid phase at normal preparation and serving temperatures and may be generally referred to as liquid lipids. For reasons including health and weight control, it is usually desirable to remove the liquid lipids before consuming the food. Present removal methods include:

Chilling the food to remove the lipids while in a solid state. This is time consuming, costly and inconvenient.

Skimming with a spoon-like utensil. This method is messy, time consuming and only partially effective.

Using gravity type separators. These require that the food be transferred from the cooking utensil and involve considerable cleaning of additional utensils. Their primary disadvantage is an inability to function effectively on foods containing solid ingredients. These devices operate by draining the heavier aqueous components from beneath the floating liquid lipids. Solid ingredients often clog or become trapped by the valve or restricted opening in the device.

Using absorbing devices employing fibrous materials. These are generally inefficient since closely packed fibers tend to absorb and trap aqueous solutions. Widely spaced fibers have very limited capacity and absorbed lipids are easily dislodged by normal manipulation of the device. If designed to be reusable, fibrous materials are extremely difficult to clean thoroughly enough to be sanitary. Fibrous materials exhibit little, if any, ability to lift liquid lipids by capillary action and are therefore ineffective on many foods containing solid ingredients.

SUMMARY OF THE INVENTION

A primary object of the present invention is to provide a device which will selectively absorb floating liquid lipids from an aqueous food mixture while not absorbing appreciable quantities of water or other ingredients present in the food.

It is another object of this invention to provide a device which will, when exposed to an aqueous food mixture, quickly absorb and securely retain liquid lipids for convenient removal.

It is another object of this invention to provide a device which will conveniently absorb liquid lipids during or immediately following preparation, while the food is near boiling temperature and is contained within the original cooking utensil.

It is another object of this invention to provide a device which will lift and absorb liquid lipids from foods containing a high percentage of solid ingredients.

It is yet another object of this invention to provide a device, with the above capabilities, which has a high capacity for absorbing liquid lipids while having a unit cost low enough to justify disposal after one use and thereby circumvent cleaning.

The above and other beneficial objects and advantages of the present invention are accomplished by a device shown and described in the accompanying drawings and descriptions.

BRIEF DESCRIPTION OF THE DRAWINGS

For a fuller understanding of the invention, reference is made to the following description and accompanying drawing figures, listed below, in which like reference numerals denote like elements in all of the views.

DESCRIPTION OF THE INVENTION

Figure 1:
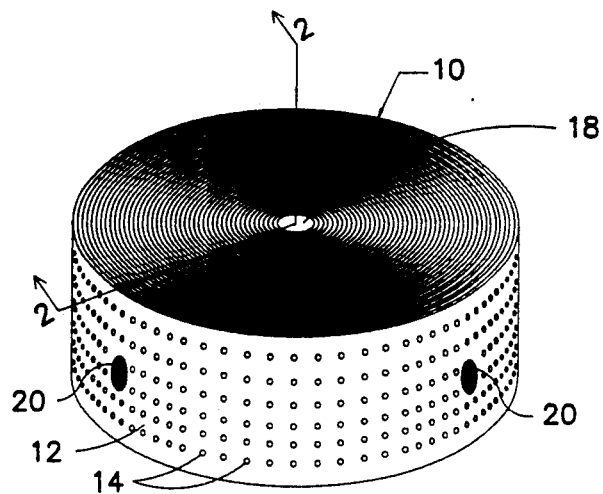
FIG. 1 is a perspective view of a preferred embodiment of the present invention.

Referring to drawing FIG. 1, there is shown a preferred embodiment of the invention as a completed disc-shaped device 10 comprising elements too small to be shown in a view of the entire unit.

Figure 2:
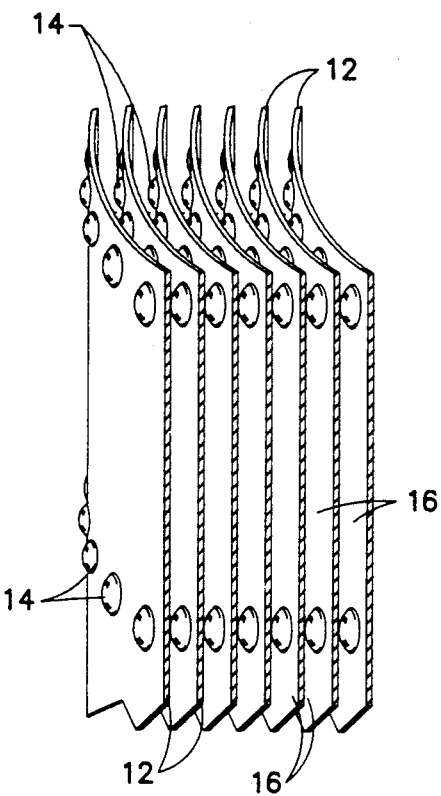
FIG. 2 is a greatly enlarged, perspective, fragmented cross-section view of the invention, taken along line 2—2 in FIG. 1, showing the basic elements.

Referring now to FIG. 2 (with occasional reference to FIG. 1), there is shown a greatly enlarged, perspective, fragmented cross-section view illustrating the two basic elements which make up the body of device 10. The first basic element is a multitude of partitions 12 made of a pellicular material having a thickness of about 0.013 MM (0.5 MIL) to 0.08 MM (3 MIL). Pellicular material being a term used to describe thin skinlike substances, including those in the form of sheets or films. Partitions 12 have a preferred uniform height of about 13 MM to 38 MM and a length appropriate to the design of device 10. The pellicular material possessing the following properties: The material must lack affinity for and not readily absorb water; this is generally referred to as being hydrophobic in nature. Upon exposure, it must readily attract a coating of liquid lipids; this is generally referred to as being lipophilic in nature. A preferred material is polyethylene film or sheet; other suitable materials include, for example: many other plastics, cellophane and various paper type products, many in common use in wrapping and packaging, which have been plasticized, impregnated, coated, laminated or similarly treated to be moisture resistant. The multitude of partitions 12 are arranged in what may best be described as a horizontally oriented stack wherein the broader surfaces are adjacent, and the surface represented above as a height dimension is positioned vertically.

The second basic element is a multitude of capillary passages 16 of a controlled size existing between adjacent surfaces of partitions 12 within the previously described stack and extending through the stack between its top and bottom faces. Those faces having a noncontinuous surface made up of the thin edges of partitions 12 and the open ends of capillary passages 16. Partition 12 are provided with a series of protuberances 14 which serve to separate adjacent surfaces thereby establishing and maintaining capillary passages 16.

Polyethylene and other suitable materials may vary in thickness, rigidity and the degree of hydrophobic and lipophilic properties. Certain design details are adapted accordingly; for example: To function effectively, the horizontal cross-section of capillary passages 16 need be controlled in only one direction. Therefore, protuberances 14 or other methods of maintaining separation of adjacent surfaces are configured and spaced to suit the rigidity and other properties of a particular material and may provide either horizontally interrupted or continuously interconnected capillary passages 16. A horizontal dimension of capillary passages 16 is maintained within a range where capillary action will cause a significant rise of liquid lipids when a flat face of device 10 is exposed to these substances. And, where absorbed liquid lipids will be retained during normal manipulation of device 10. Since the absorbing capacity of device 10 is directly proportional to the volume of capillary passages 16 and inversely proportional to the volume of partitions 12 a preferred ratio is six or more to one, respectively.

To provide a useful device, convenient for its intended purpose, the stack of partitions 12 and capillary passages 16 is stabilized to preserve its unity and form. A preferred method of stabilizing and other features are best explained by the following description detailing the construction of a typical example of device 10.

Referring again to FIG. 1 and 2, the stack of basic elements comprising the body of device 10 is formed from a single piece of polyethylene film having a height of 25 MM, a thickness of 0.025 MM (1 MIL) and a length of 23 M, sufficient to produce all of the incorporated partitions 12, connected end to end. Six equally spaced rows of protuberances 14 span the height of the piece of film and extend throughout its length. Protuberances 14 have a major diameter of 0.65 MM, project 0.23 to 0.25 MM, are spaced four per CM within each row and are produced by indenting the opposite surface of the film. The piece of film with protuberances 14 is spirally coiled around center hole 18 producing a disc shaped stack having a diameter of about 8.4 CM, flat upper and lower faces and a height equal to that of the piece of film. When coiled, each turn or layer of film becomes a circular partition 12, of an increasingly larger diameter separated by corresponding capillary passages 16. Partial stabilization of the disc shaped stack of basic elements which forms the body of device 10 is inherent in the coiled configuration. Additional stabilization is provided by attaching each partition 12 to those adjacent using a total of four equally spaced holes 20 which radially pierce the stack from positions axially centered on the outer partition 12 to converge at center hole 18. Holes 20 have a diameter of 8 MM and are produced by melting, with a heated probe or other suitable techniques, causing each partition 12 to melt and partially fuse to those adjacent in a confined area immediately surrounding holes 20.

Figure 3:
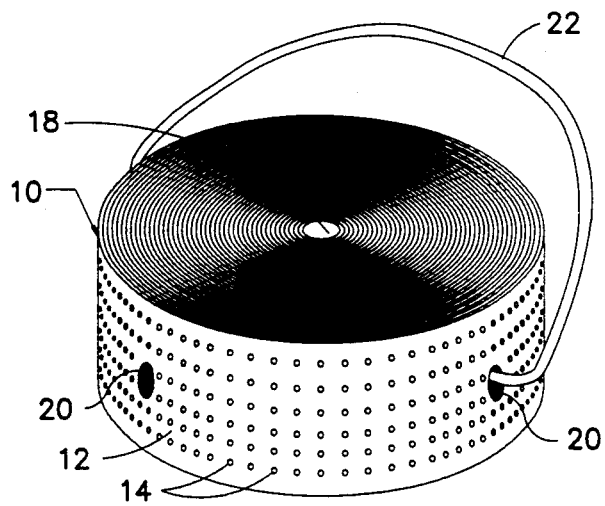
FIG. 3 is a perspective view of a preferred embodiment of the invention with an optional lifting handle.

Referring to FIG. 3, device 10, as previously described, is shown with an optional handle 22 for convenient lifting and manipulation. Handle 22 being a length of string captively secured to device 10 by passing it through two aligned holes 20 and knotting it into a continuous loop. The loop is of sufficient length to be freely passed over device 10 allowing either flat face to be in the bottom position when device 10 is suspended from handle 22.

OPERATION OF THE INVENTION

Referring again to FIG. 1, 2 and 3, following is a brief description of the manner in which device 10 is used and the theory of its operation. Certain phenomena described are what I believe to be occurring based on testing and observation. In use, device 10 is lifted and manipulated using a spatula, serrated spoon or the optional handle 22, if so equipped. It is placed, with a flat face down, onto an aqueous food mixture, where it floats with the lower portion beneath the surface. When used on foods containing solid ingredients, the edges of partitions 12 effectively form a strainer to displace those solids. Since it absorbs only from the top and bottom flat faces, it is repeatedly raised, repositioned and lowered until all of the food surface has been contacted. It is then turned completely over to expose the other face, and the process is repeated.

Upon exposure to the food mixture, liquids enter capillary passages 16 and liquid lipids adhere to partitions 12. When sufficient liquid lipids have accumulated within capillary passages 16, capillary action causes them to rise above the surface of the food. When device 10 is raised above the food, liquid lipids are retained by interaction of their adherence to partitions 12 and their cohesive properties. Capillary passages 16 are capable of absorbing water but this doesn't occur in normal use. Floating liquid lipids are encountered first, are attracted to partitions 12 and effectively seal the openings to exclude water.

CONCLUSION, RAMIFICATIONS AND SCOPE OF THE INVENTION

While the foregoing description includes many specific details, it should be understood that these are only illustrations of the presently preferred embodiments of the invention including a typical example. Modifications and changes, including the following examples, may be made without departing from the spirit of the invention:

A stack of the invention's basic elements comprising partitions separated by capillary passages can be constructed in various shapes and sizes and by methods other than the preferred coiled configuration, for example: a stack of individual straight or folded partitions, a slit and folded sheet of connected partitions or various combinations of the above.

Methods of maintaining separation of partitions to create capillary passages may include the following: Protuberances in a variety of shapes and sizes, integral embossments, particles embedded in or attached to partitions. Or, interleaving flat or formed partitions with others incorporating corrugations, ridges, folds, spacers or the like.

Stabilizing features to maintain the unity and form of a stack of partitions and capillary passage will vary depending on design and materials and may include the following: Attaching partitions to those adjacent or to a separate support by adhesives, thermal bonding, mechanical interlocking or other suitable methods. Attaching, by any of the above methods, protuberances or other methods of separating partitions to adjacent partitions thereby producing a unified structure. Or, producing by suitable techniques, an equivalent, unified, honeycomb type structure wherein the partitions and method of maintaining their separation are continuously interconnected. Partial or total enclosure within a skeletal or meshlike container of suitable materials.

In addition to the optional string handle, previously described, others may be made from cord, plastic ribbon or similar materials and attached to the device or an enclosing container by adhesives, thermal bonding, mechanical fastening or other suitable methods.

In reviewing the preceding descriptions and explanations, it will be seen that a device in accordance with the present invention exhibits certain unique and exceptional properties and advantages, including the following: The ability to selectively absorb liquid lipids while not absorbing appreciable quantities of water or other ingredients present in the food mixture. The ability to effectively lift and absorb liquid lipids from foods containing a high percentage of solid ingredients. Exceptional capacity in relation to construction materials, thereby making a disposable device practical. The ability to retain absorbed liquid lipids secured between solid surfaces where they are not easily dislodged by normal manipulation of the device.

It should be noted that all materials used in the construction of a device in accordance with the present invention should be safe for use in direct contact with foods.

While many novel features and specifications of a typical example, preferred embodiments and equivalent alternatives have been shown described, these should not be construed as limiting the scope of the present invention. Other changes and modifications may be made by those skilled in the art without departing from the spirit of the invention. Therefore, the scope of the invention should be determined by the appended claims and their legal equivalents.

I claim:

1. A disposable device for lifting, absorbing and retaining liquid lipids floating upon an aqueous food mixture, said device comprising:
   (a) a multitude of generally vertical capillary passages existing between a corresponding series of partitions of a pellicular material possessing both hydrophobic and lipophilic properties, said capillary passages having a horizontal cross section of a predetermined size and a generally uniform height of about 13 MM to 38 MM extend, with said partitions, through said device where they terminate forming a top and a bottom face each having a noncontinuous surface comprising the top or bottom extremes of said partitions separated by said capillary passages;
   (b) a spacing means for establishing and maintaining a predetermined separation of adjacent surfaces of said partitions thereby creating said capillary passages; and
   (c) means for stabilizing said device to maintain its unity and form.

2. A disposable device for absorbing liquid lipids as set forth in claim 1, further including a lifting means comprising a handle secured to said device.

3. A disposable device for lifting, absorbing and retaining liquid lipids floating upon an aqueous food mixture, said device comprising:
   (a) a multitude of generally vertical partitions of a pellicular material possessing both hydrophobic and lipophilic properties, said partitions having a predetermined length and a generally uniform height of about 13 MM to 38 MM arranged in a horizontally oriented stack wherein the vertical surfaces of said partitions, outlined by said length and said height, are adjacent and the top edges of said partitions collectively form a top face of said stack and the bottom edges of said partitions collectively form a bottom face of said stack;
   (b) a capillary passage existing between each layer of said partitions within said stack and extending through said stack between said top face and said bottom face;
   (c) a spacing means for establishing and maintaining a predetermined separation of adjacent surfaces of said partitions within said stack thereby creating said capillary passages; and
   (d) means for stabilizing said stack to maintain its unity and form.

4. A disposable device for absorbing liquid lipids as set forth in claim 3 wherein a single piece of said pellicular material of said generally uniform height and a length equal to the sum of the lengths of all said multitude of generally vertical partitions is spirally coiled to form said horizontally oriented stack.

5. A disposable device for absorbing liquid lipids as set forth in claim 3, further including a lifting means comprising a handle secured to said device.

* * * * *